(12) United States Patent
Liu

(10) Patent No.: US 11,724,446 B2
(45) Date of Patent: Aug. 15, 2023

(54) ADDITIVE MANUFACTURING SYSTEM, ADDITIVE MANUFACTURING METHOD AND COMPUTER-READABLE MEDIUM

(71) Applicant: AIRBUS (BEIJING) ENGINEERING CENTRE COMPANY LIMITED, Beijing (CN)

(72) Inventor: Ming Liu, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 88 days.

(21) Appl. No.: 17/146,942

(22) Filed: Jan. 12, 2021

(65) Prior Publication Data

US 2021/0213676 A1 Jul. 15, 2021

(30) Foreign Application Priority Data

Jan. 13, 2020 (CN) .......................... 202010032449.1

(51) Int. Cl.
*B29C 64/153* (2017.01)
*B29C 64/314* (2017.01)
*B33Y 10/00* (2015.01)
*B29C 64/209* (2017.01)
*B29C 64/245* (2017.01)
(Continued)

(52) U.S. Cl.
CPC ............ *B33Y 10/00* (2014.12); *B29C 64/153* (2017.08); *B29C 64/209* (2017.08); *B29C 64/245* (2017.08); *B29C 64/268* (2017.08); *B29C 64/314* (2017.08); *B29C 64/336* (2017.08);
(Continued)

(58) Field of Classification Search
CPC ... B29C 64/153; B29C 64/314; B29C 64/245; B29C 64/209; B29C 64/393; B29C 64/268; B29C 64/336; B33Y 10/00; B33Y 30/00; B33Y 50/02
See application file for complete search history.

(56) References Cited

U.S. PATENT DOCUMENTS

| 6,491,967 | B1 * | 12/2002 | Corderman | .......... B01J 19/0046 |
| | | | | 506/13 |
| 2019/0047088 | A1 * | 2/2019 | Riemann | .............. B23K 26/703 |

FOREIGN PATENT DOCUMENTS

| CN | 108393558 | 8/2018 |
| CN | 108941581 | 12/2018 |
| CN | 109079137 | 12/2018 |

* cited by examiner

*Primary Examiner* — Joseph S Del Sole
*Assistant Examiner* — John Robitaille
(74) *Attorney, Agent, or Firm* — Nixon & Vanderhye P.C.

(57) ABSTRACT

An additive manufacturing system is disclosed including multiple conveying pipelines, a mixer and a nozzle. The multiple conveying pipelines are connected to respective material sources. The multiple conveying pipelines are connected to the mixer which is configured to mix in real time powder materials supplied via the multiple conveying pipelines during additive manufacturing. The mixer is connected via a supply pipeline to the nozzle which is configured to deliver mixed material onto a substrate to perform the additive manufacturing. Each of the multiple conveying pipelines is configured to change conveying amount or speed of the powder materials in real time. An additive manufacturing method for the above additive manufacturing system is also disclosed. The additive manufacturing system and method can adjust in real time types or proportions of the materials so as to meet different property requirements for different parts of a product.

15 Claims, 3 Drawing Sheets

(51) Int. Cl.
B29C 64/393 (2017.01)
B29C 64/336 (2017.01)
B29C 64/268 (2017.01)
B33Y 50/02 (2015.01)
B33Y 30/00 (2015.01)

(52) U.S. Cl.
CPC ............ B29C 64/393 (2017.08); *B33Y 30/00* (2014.12); *B33Y 50/02* (2014.12)

ADDITIVE MANUFACTURING SYSTEM, ADDITIVE MANUFACTURING METHOD AND COMPUTER-READABLE MEDIUM

CROSS REFERENCE TO RELATED APPLICATION

This application claims priority to Chinese Patent Application Number CN 202010032449.1, filed Jan. 13, 2020, the entire contents of which is hereby incorporated by reference.

FIELD OF THE INVENTION

The application relates to the technical field of material processing and, in particular, to an additive manufacturing method and an additive manufacturing system for performing additive manufacturing process with a heat source such as a laser and an arc to form a product.

BACKGROUND OF THE INVENTION

A high-entropy alloy is formed by alloying a variety of material elements (usually 5 or more material elements) in a certain proportion, where each material element is in a range of 5% to 35%. Therefore, the high-entropy alloy has higher mixing entropy than a melting entropy of a traditional alloy. The high-entropy alloy has excellent properties, such as high strength, high hardness, high wear resistance and corrosion resistance, high thermal resistance, and high electric resistance, as compared with some traditional alloys. The properties of the high-entropy alloy may be varied by changing types or proportions of the material elements.

In manufacturing a high-entropy alloy product for example by an existing additive manufacturing method, the variety of material elements are mixed firstly in a certain proportion, and then an additive manufacturing system is started to process the material elements mixed in the constant proportion so as to form a final product. In the existing additive manufacturing method, since the mixing step is completed before the start of additive manufacturing process, the types or the proportions of the material elements cannot be changed in real time or precisely during the additive manufacturing. As a result, it can be used to produce only a product with uniform property, instead of a functionally grade high-entropy alloy product which meets specific requirements, i.e., an alloy product with gradually changing properties such as strength. In addition, raw materials which are mixed and not used up may also be wasted.

SUMMARY OF THE INVENTION

An object of the present application is to provide an additive manufacturing method and an additive manufacturing system capable of changing amount of powder materials in real time and/or precisely.

According to an aspect of the present disclosure, an additive manufacturing system is provided. The additive manufacturing system includes: multiple conveying pipelines connected to respective material sources; a mixer to which the multiple conveying pipelines are connected and which is configured to mix, in real time, different types of powder materials supplied with airflow via the multiple conveying pipelines, during additive manufacturing process; and a nozzle to which the mixer is connected via a supply pipelines and which is configured to deliver mixed material onto a substrate to perform the additive manufacturing, wherein each of the multiple conveying pipelines is configured to change a conveying amount or speed of the powder materials in real time.

In the additive manufacturing system of the present disclosure, since the multiple conveying pipelines are connected to the mixer and the mixer is connected to the nozzle, the powder materials may be supplied with an inert gas in real time and mixed in real time. The inert gas such as helium or argon is conveyed together with the powder materials, and the speed of the inert gas may be changed so as to change conveying speed of the powder materials, thereby changing a supply quantity of the powder materials. In this way, the additive manufacturing system of the present disclosure may provide flexibility in material supply. For example, types or proportions of the supplied powder materials may be changed in real time, thereby meeting different property requirements for different parts of a product.

In some examples of the additive manufacturing system, the nozzle may have an inner wall and an outer wall, and an annular space may be formed between the inner wall and the outer wall to receive the mixed material.

In some examples of the additive manufacturing system, a laser or an arc welding device may be further included for melting the mixed material. The inner wall of the nozzle may be configured to enable passage for a laser beam emitted by the laser or an electrode of the arc welding device.

In some examples of the additive manufacturing system, the inner wall and the outer wall of the nozzle may be coaxially disposed so that the mixed material is concentric with the heat source, thereby improving product quality.

In some examples of the additive manufacturing system, each of the inner wall and the outer wall of the nozzle may include a cylindrical section and/or a tapered section.

In some examples of the additive manufacturing system, a controller is further included and configured to control the conveying quantity or speed of the powder materials in each of the multiple conveying pipelines in real time.

In some examples of the additive manufacturing system, a heating device is further included for heating the substrate and/or the mixed material.

According to another aspect of the present disclosure, an additive manufacturing method is provided. The additive manufacturing method includes: conveying different types of powder materials from material sources via multiple conveying pipelines to a mixer; mixing the powder materials in real time in the mixer; and delivering the mixed material with airflow onto a substrate via a nozzle to perform additive manufacturing, where conveying the powder materials via the multiple conveying pipelines includes changing a conveying quantity or speed of the powder materials in real time.

In some examples of the additive manufacturing method, it further includes loading product manufacturing data and control parameters, before conveying the powder materials from the material sources, into a controller for controlling the conveying amount and speed of the powder materials based on the loaded data.

In some examples of the additive manufacturing method, it further includes melting the mixed material by a laser or an arc welding device.

In some examples of the additive manufacturing method, it further includes providing a protective gas for an electrode of the arc welding device during a process of melting the mixed material by the arc welding device.

In some examples of the additive manufacturing method, in a case that the mixed material is melted by the laser, the nozzle and a laser beam of the laser is perpendicular to the substrate or form a predetermined angle with respect to the substrate, and the mixed material is discharged around the laser beam onto the substrate.

In some examples of the additive manufacturing method, in a case that the mixed material is melted by the arc welding device, the nozzle and the electrode of the arc welding device are at an angle with respect to the substrate, and the mixed material is discharged around the electrode onto the substrate.

In some examples of the additive manufacturing method, it further includes heating the substrate and/or the mixed material by a heating device during a manufacturing process. In this way, a temperature grade between the powder materials and a melt pool can be reduced. Reducing the temperature grade can improve the quality of a structural member formed by additive manufacturing.

The additive manufacturing method according to the present application may have the same or similar technical effects as the above-mentioned additive manufacturing system.

According to yet another aspect of the present disclosure, a computer-readable medium is provided. A program is stored on the computer-readable medium, and the program, when being executed by a processor of a control unit, causes the processor to perform the additive manufacturing method described above.

Other advantages and features of the present application will become apparent in the following non-limiting detailed description.

BRIEF DESCRIPTION OF THE DRAWINGS

Features and advantages of one or more embodiments of the present application will become more readily understood from the following description with reference to the accompanying drawings in which.

In all accompanying drawings, the same reference signs indicate the same parts.

DETAILED DESCRIPTION

Hereinafter, the present application will be described in detail by means of exemplary embodiments with reference to the accompanying drawings. The following detailed description to the present application is for illustrative purpose only and is by no means to limit the present application and the applications or usage thereof.

Figure 1:
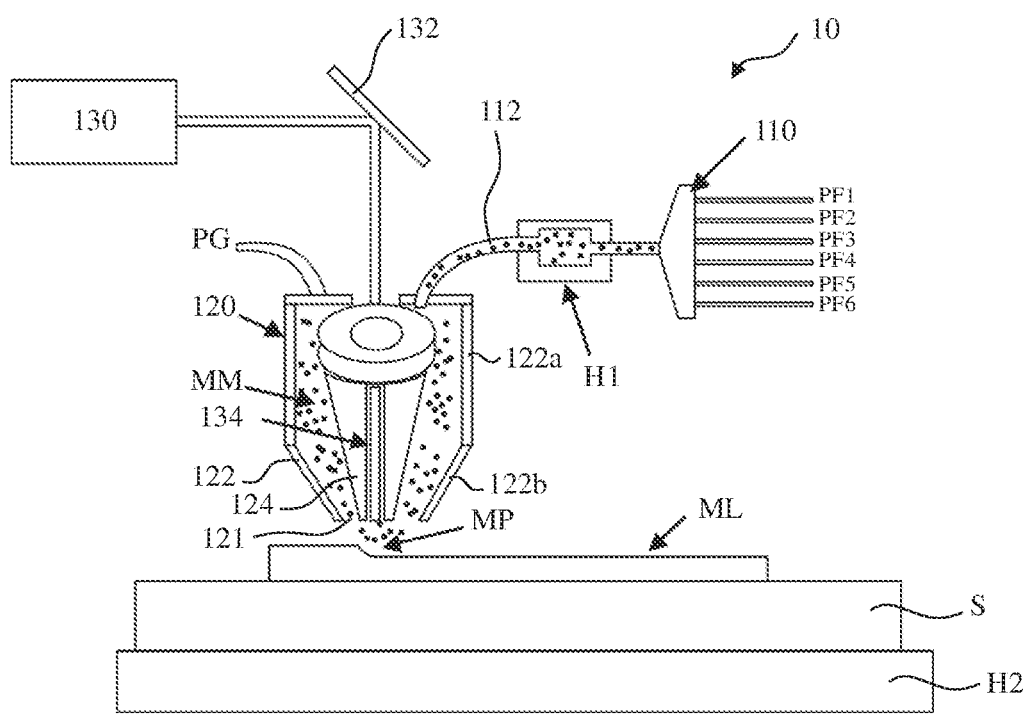
FIG. 1 is a schematic structural diagram of an additive manufacturing system according to an embodiment of the present disclosure.

FIG. 1 is a schematic structural diagram of an additive manufacturing system 10 according to an embodiment of the present disclosure. The additive manufacturing system 10 in FIG. 1 uses a laser as a heat source, and thus it may also be referred to as a laser additive manufacturing system herein. As shown in FIG. 1, the additive manufacturing system 10 includes multiple conveying pipelines PF1 to PF6 for conveying raw materials, a mixer 110, a supply pipeline 112, a nozzle 120, a laser 130, an optical device 132, a substrate S, and heaters H1 and H2.

The multiple conveying pipelines PF1 to PF6 connect material sources (not shown) to the mixer 110 so as to supply materials in the material sources into the mixer 110. As needed, the conveying pipelines PF1 to PF6 may be connected to different material sources, or some of the conveying pipelines PF1 to PF6 may be connected to the same material source, for example, to meet a large demand of material in the material source. The conveying pipelines PF1 to PF6 may be used to convey metal powder materials.

An air supply device may be provided at the conveying pipelines PF1 to PF6 for the powder materials to supply an inert gas, such as helium or argon, into the powder materials, so that the inert gas carries the powder materials into the mixer 110.

Each of the multiple conveying pipelines PF1 to PF6 may be configured to change in real time a conveying amount or speed of the material during the additive manufacturing. For example, the conveying speed of the powder material may be changed by changing a flow rate of the inert gas, and thereby changing the conveying amount of the powder material. Alternatively, valves may be provided in the conveying pipelines PF1 to PF6 to control the opening or closing of the conveying pipelines or the degree of opening to control the conveying speed. In another embodiment, the conveying speed of the material may be changed in real time by controlling a rotation speed of a screw propeller installed in the conveying pipeline.

A supply rate of the material may be, for example, in a range of 0 g/min to 20 g/min. The supply rate of the material may be adjusted in real time according to a model data of a product to be processed so as to manufacture a functionally graded high-entropy alloy product.

The mixer 110 is connected to the nozzle 120 via the supply pipeline 112. During the additive manufacturing, various materials conveyed via the conveying pipelines PF1 to PF6 are mixed in the mixer 110 in real time. The mixed material MM in the mixer 110 is supplied into the nozzle 120 via the supply pipeline 112. The mixer may be implemented as various existing mixing devices, such as a spiral stirring mixing device.

The nozzle 120 is configured to discharge the mixed material MM, which is mixed in the mixer 110 and supplied via the supply pipeline 112, onto the substrate S moving relative to the nozzle so as to perform the additive manufacturing, seeing a material layer ML in FIG. 1.

The additive manufacturing system 10 shown in FIG. 1 may supply and mix the materials in real time, and may change in real time types or proportions of the materials during the additive manufacturing. Therefore, the additive manufacturing system 10 shown in FIG. 1 can meet different property requirements for different parts of a product. The supply of the materials may be changed in real time according to actual needs, therefore providing great flexibility.

In the example of FIG. 1, the nozzle 120 has an inner wall 124 and an outer wall 122. An annular space is formed between the inner wall 124 and the outer wall 122 to receive the mixed material MM. The internal space defined by the inner wall 124 may allow a laser beam 134 to pass therethrough. The lower end of the outer wall 122 may be provided with an opening 121 so as to lay the mixed material MM inside the annular space onto the substrate S. The mixed material MM coming out of the opening 121 surrounds the laser beam 134 so that the mixed material MM may be uniformly heated and melted. In other words, the mixed material MM coming out of the opening 121 may accurately drop into an effective heat source region.

The inner wall 124 and the outer wall 122 of the nozzle 120 may be coaxially disposed, that is, the central axis of the inner wall 124 coincides with the central axis of the outer wall 122. In the example of FIG. 1, the inner wall 124 of the nozzle 120 has generally a tapered shape. The outer wall 122 has a cylindrical section 122a and a tapered section 122b. The opening 121 is formed at the lower end of the tapered section 122b. The tapered section 122b may be adapted to shrink laser plasma, a powder beam flow, and a range of a protective gas, thereby increasing the energy density of the heat source. It should be understood that the shape of the nozzle 120 is not limited to the specific example as shown in FIG. 1, but may be changed according to specific requirements.

The laser beam 134 generated by the laser 130 is irradiated onto the material layer ML after passing through the optical device 132 and the internal space of the inner wall 124, and the mixed material is melted at the irradiation position to form a melt pool MP.

The additive manufacturing system 10 may further include a protective gas supply device (not shown) to supply a protective gas PG into the annular space between the inner wall 124 and the outer wall 122. For example, the protective gas may flow through the nozzle 120 at a rate of 5 ml/min to 300 ml/min, optionally, 5 ml/min to 200 ml/min.

Before or during the additive manufacturing, the heater H1 is adapted to heat the supplied mixed material and/or maintain its temperature within a predetermined range, such as from 50° C. to 250° C. The heater H1 may be provided on the supply pipeline 112 such that the mixed material is heated when it is passing through the supply pipeline 112. A temperature grade between the temperature of the mixed material and a melting temperature of the mixed material can be reduced by providing the heater H1, thereby improving quality of a final product.

Before, during or after the additive manufacturing, the substrate S may be heated by the heater H2. Further, the substrate S may heat the material layer ML and/or maintain a temperature of the material layer ML within a predetermined range, for example, from 100° C. to 300° C. The heater H2 may be provided on one side (the lower side in FIG. 2) of the substrate S. Stress deformation and the like of the high-entropy alloy product can be reduced by providing the heater H2.

The heaters H1 and H2 form the heating device described herein. The heating device may be a resistance heating device or an electromagnetic heating device. It should be understood that the heating device may also be any other suitable heating means, such as an electron beam.

The additive manufacturing system 10 includes a controller (not shown). The model data of the product is stored in a storage unit of the controller. During the additive manufacturing, the controller may control various parts according to the stored model data, especially may change in real time the compositions or proportions of the materials to coordinately complete the processing of the product.

Figure 2:
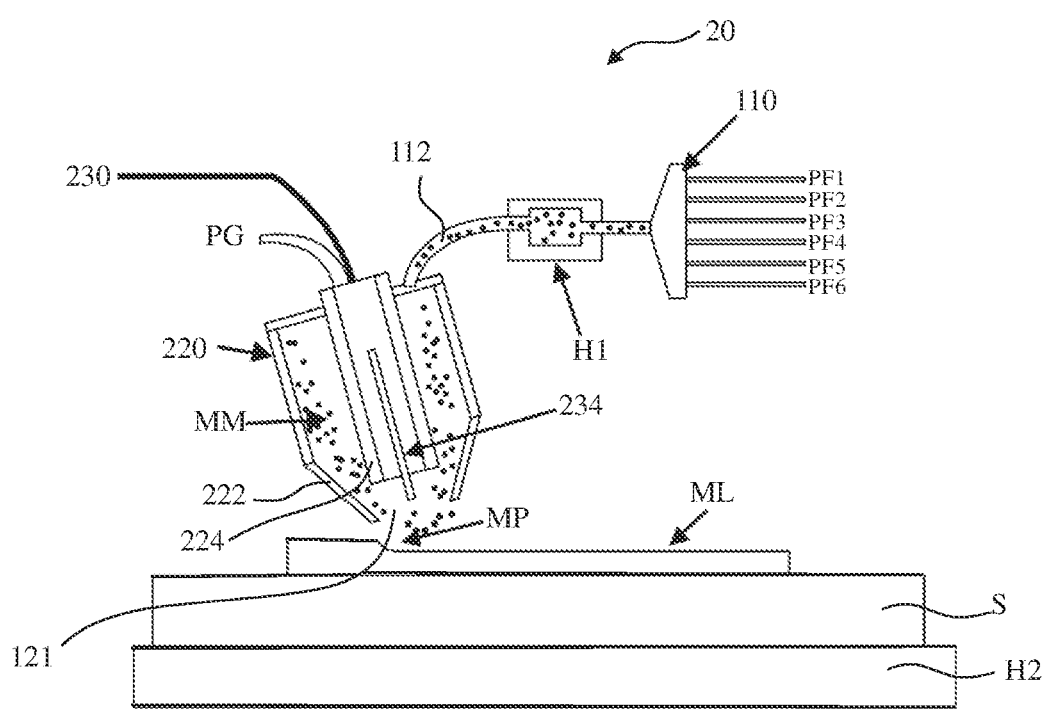
FIG. 2 is a schematic structural diagram of an additive manufacturing system according to another embodiment of the present disclosure.

FIG. 2 is a schematic structural diagram of an additive manufacturing system 20 according to another embodiment of the present disclosure. The additive manufacturing system 20 uses an electric arc as a heat source, and thus it may also be referred to as an arc additive manufacturing system herein. The same portions of the additive manufacturing system 20 in FIG. 2 as those of the additive manufacturing system 10 in FIG. 1 are indicated with the same reference signs, and detailed descriptions thereof are omitted. Hereinafter, different portions of the additive manufacturing system 20 in FIG. 2 from the additive manufacturing system 10 in FIG. 1 will be described in detail.

Differences between the additive manufacturing system 20 in FIG. 2 and the additive manufacturing system 10 in FIG. 1 lie in the following: the arc being used as the heat source, the orientation of a nozzle, and a shape of an inner wall of the nozzle. Referring to FIG. 2, the additive manufacturing system 20 includes a welder 230 and a nozzle 220. The welder 230 may be, for example, a tungsten inert gas welder. The nozzle 220 has a substantially cylindrical inner wall 224, and an electrode of the welder 230 is housed in an inner space of the inner wall 224. The additive manufacturing system 20 may further include a protective gas supply device (not shown) to supply the protective gas PG into the internal space of the inner wall 224. For example, the protective gas may flow through the nozzle 220 at a rate of 5 ml/min to 300 ml/min, optionally, 5 ml/min to 200 ml/min.

The nozzle 120 of the additive manufacturing system 10 in FIG. 1 is positioned in such a way that the laser beam 134 is approximately perpendicular to the material layer ML, whereas the nozzle 220 of the additive manufacturing system 20 in FIG. 2 is at a certain acute angle with respect to the material layer ML. The setting of the angle facilitates the tungsten electrode to form the arc, and prevents the tungsten electrode and the nozzle from excessive burnout by the arc. It should be understood that the orientation of the nozzle may be changed according to a specific additive manufacturing method.

The additive manufacturing system 20 in FIG. 2 has technical effects similar to those of the additive manufacturing system 10 in FIG. 1, and thus details thereof are not described herein again. In addition, it should be understood that the present application is not limited to the additive manufacturing systems using the laser and the arc as heat sources, but may be applied to an additive manufacturing system having any suitable heat source.

Figure 3:
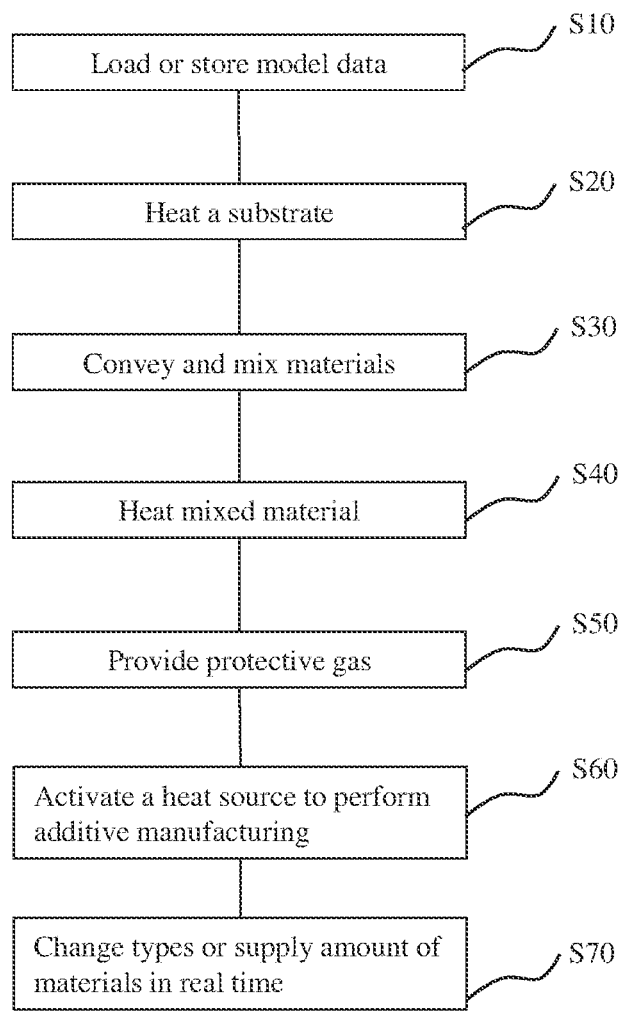
FIG. 3 is a schematic flowchart of an additive manufacturing method according to an embodiment of the present disclosure.

Hereinafter, an additive manufacturing method implemented by the additive manufacturing system according to the present application will be described with reference to FIG. 3. As shown in FIG. 3, model data and/or control parameters of a product to be manufactured are firstly stored or loaded into a storage unit of a controller (step S10). Step S10 may be performed before materials is conveyed from material sources, so as to control a conveying amount and a conveying speed of the materials according to the loaded data. The heater H2 is activated to pre-heat a substrate S (step S20). Various materials are conveyed via conveying pipelines PF1 to PF6 and are mixed in a mixer 110 to form a desired mixed material (step S30). The heater H1 is activated to heat a mixed material supplied via a supply pipeline 112 (step S40), for example, to 50° C. to 250° C. In a case that a heat source is a welder, a protective gas device is opened to allow the protective gas to pass through a nozzle at a certain rate (step S50). The heat source (for example, a laser 130 or a welder 230) is activated to perform the additive manufacturing (step S60). Parameters (for example, for a laser, these parameters include laser power, spot size, scanning speed, etc.) of the heat source may be preset according to the stored model data of the product, or may be adjusted in real time based on of the model data. During the additive manufacturing, types or supply amount of the materials are adjusted in real time based on the model data to manufacture a high-entropy alloy product with a required functional grade (step S70). After performing the additive manufacturing, conveying and supply of the materials may be stopped, and the heat source, protective gas device and heating devices, etc., may be turned off. The heater H2 may be turned off when the temperature of the substrate S drops below 100° C., thereby reducing the stress deformation of the high-entropy alloy product.

FIG. 3 shows only one example of an additive manufacturing method according to the present application. It should be understood that the present application is not limited to the specific example shown in FIG. 3. In a case that steps of the method are not contradictory with each other, implementation order of some steps may be changed, or a step may be omitted, or other steps may be added. For example, heating steps S20 and S40 may last the entire process of the additive manufacturing, or may only be performed intermittently when needed. In a case of different heat sources, step S50 of providing a protective gas may be omitted.

A controller in the present application may be implemented as a processor in a computer. The additive manufacturing method described herein may be implemented by one or more computer programs executed by the processor of the computer. The computer programs include processor-executable instructions stored on a non-transitory tangible computer-readable medium. The computer programs may also include the stored data. Non-limiting examples of the non-transitory tangible computer-readable medium are non-volatile memory, magnetic storage devices, and optical storage devices.

The term computer-readable medium does not include transient electrical or electromagnetic signals that propagate by means of the medium (such as on a carrier); the term computer-readable medium may therefore be considered to be tangible and non-transitory. Non-limiting examples of non-transitory tangible computer-readable medium are non-volatile memory (such as flash memory, erasable programmable read-only memory or mask read-only memory), volatile memory (such as static random access memory circuit or dynamic random access memory), magnetic storage medium (such as analog or digital magnetic tapes or hard drives), and optical storage medium (such as CD, DVD, or Blu-ray Disc).

Although the present application has been described with reference to exemplary embodiments, it should be understood that the application is not limited to the specific embodiments/examples described and illustrated in detail herein. In this case, those skilled in the art can make various modifications to the exemplary embodiments without departing from the scope defined by the claims.

The invention claimed is:

1. An additive manufacturing system, comprising:
a plurality of conveying pipelines connected to respective material sources;
a mixer to which the plurality of conveying pipelines are connected and which is configured to mix in real time different types of powder materials supplied with airflow via the plurality of conveying pipelines during additive manufacturing; and
a nozzle to which the mixer is connected via a supply pipeline and which is configured to deliver mixed material onto a substrate to perform the additive manufacturing,
a first heater arranged on the supply pipeline to heat the powder materials as it passes through the supply pipeline,
wherein each of the plurality of conveying pipelines is configured to change conveying amount or speed of the powder material in real time.

2. The additive manufacturing system according to claim 1, wherein the nozzle has an inner wall and an outer wall, and an annular space is formed between the inner wall and the outer wall to receive the mixed material.

3. The additive manufacturing system according to claim 2, further comprising a laser or an arc welding device for melting the mixed material, wherein the inner wall of the nozzle is configured to enable passage of laser light emitted from the laser through an optical device or an electrode of the arc welding device.

4. The additive manufacturing system according to claim 2, wherein the inner wall and the outer wall of the nozzle are coaxially disposed.

5. The additive manufacturing system according to claim 4, wherein each of the inner wall and the outer wall of the nozzle comprises a cylindrical section and/or a tapered section.

6. The additive manufacturing system according to claim 1, further comprising a controller configured to control in real time the conveying amount or the conveying speed of the powder material in each of the plurality of conveying pipelines.

7. The additive manufacturing system according to claim 6, further comprising a second heating device for heating the substrate and/or the mixed material.

8. An additive manufacturing method comprising conveying, mixing and delivering materials in the additive manufacturing system of claim 1.

9. The additive manufacturing method according to claim 8, wherein the method further comprises loading product manufacturing data and control parameters, before conveying the powder materials from the material sources, into a controller to control the conveying amount and the conveying speed of the powder materials based on the loaded data.

10. The additive manufacturing method according to claim 9, further comprising melting the mixed material by a laser or an arc welding device.

11. The additive manufacturing method according to claim 10, wherein the method further comprises providing a protective gas for an electrode of the arc welding device in a process of melting the mixed material by the arc welding device.

12. The additive manufacturing method according to claim 10, wherein in a case that the mixed material is melted by the laser, the nozzle and a laser beam of the laser are perpendicular to the substrate or are at a predetermined angle with respect to the substrate, and the mixed material is conveyed around the laser beam onto the substrate.

13. The additive manufacturing method according to claim 8, wherein in a case that the mixed material is melted by the arc welding device, the nozzle and the electrode of the arc welding device are at an angle with respect to the substrate, and the mixed material is conveyed around the electrode onto the substrate.

14. The additive manufacturing method according to claim 13, further comprising heating the substrate and/or the mixed material by a heating device in a manufacturing process.

15. A computer-readable medium storing a program which, when being executed by a processor of a control unit, causes the processor to perform the additive manufacturing method using the additive manufacturing system of claim 1, the method comprising:
conveying different types of powder materials from respective material sources to a mixer via a plurality of conveying pipelines;
mixing the powder materials in real time in the mixer; and
delivering the mixed material with airflow onto a substrate via a nozzle to perform additive manufacturing, wherein conveying the powder materials via the plurality of conveying pipelines comprises changing in real time conveying amount or conveying speed of the powder materials.

\* \* \* \* \*